United States Patent
Kim et al.

(10) Patent No.: US 7,657,563 B2
(45) Date of Patent: Feb. 2, 2010

(54) SYSTEM, METHOD AND STORAGE MEDIUM FOR PROVIDING A MULTIMEDIA CONTENTS SERVICE BASED ON USER'S PREFERENCES

(75) Inventors: Munchurl Kim, Daejeon (KR); Kyeongsoo Kim, Gyeonggi-do (KR); Jong Nam Kim, Seoul (KR); Beom Goo Lee, Seoul (KR)

(73) Assignees: Research and Industrial Corporation Group, Daejeon (KR); Korean Broadcasting System, Seoul (KR)

( * ) Notice: Subject to any disclaimer, the term of this patent is extended or adjusted under 35 U.S.C. 154(b) by 976 days.

(21) Appl. No.: 11/106,628

(22) Filed: Apr. 15, 2005

(65) Prior Publication Data

US 2005/0183121 A1    Aug. 18, 2005

Related U.S. Application Data

(63) Continuation of application No. PCT/KR03/02139, filed on Oct. 15, 2003.

(30) Foreign Application Priority Data

Oct. 15, 2002  (KR)  ........... 10-2002-0062709
Feb. 27, 2003  (KR)  ........... 10-2003-0012338

(51) Int. Cl.
    *G06F 7/00*    (2006.01)
(52) U.S. Cl. ........... 707/104.1; 725/9
(58) Field of Classification Search ........... 707/3, 707/8–10, 203, 104.1, 200, 7; 725/9, 38, 725/61

See application file for complete search history.

(56) References Cited

U.S. PATENT DOCUMENTS

| 6,289,165 | B1 | 9/2001 | Abecassis |
| 7,181,757 | B1* | 2/2007 | Kim et al. ............ 725/61 |
| 2001/0036355 | A1* | 11/2001 | Kelly et al. ............ 386/52 |
| 2001/0045962 | A1 | 11/2001 | Lee et al. |
| 2001/0047517 | A1 | 11/2001 | Christopoulos et al. |
| 2001/0051997 | A1 | 12/2001 | Oku |
| 2001/0054178 | A1 | 12/2001 | Lee et al. |
| 2002/0120925 | A1* | 8/2002 | Logan ............ 725/9 |
| 2002/0143972 | A1 | 10/2002 | Christopoulos et al. |
| 2003/0126603 | A1* | 7/2003 | Kim et al. ............ 725/38 |

FOREIGN PATENT DOCUMENTS

| EP | 1 094 409 A | 4/2001 |
| EP | 1150505 | 10/2001 |
| JP | 2001-292115 | 10/2001 |
| KR | 2001-0098898 | 11/2001 |
| KR | 2001-0107394 | 12/2001 |
| KR | 2001-0110000 | 12/2001 |
| KR | 2002-0005147 | 1/2002 |
| KR | 2002-0015223 | 2/2002 |
| KR | 2002-0039791 | 5/2002 |
| KR | 2002-0048501 | 6/2002 |
| WO | WO 02/056563 A | 7/2002 |

* cited by examiner

*Primary Examiner*—Wilson Lee
(74) *Attorney, Agent, or Firm*—Bacon & Thomas, PLLC

(57) ABSTRACT

A multimedia contents service system transforms original contents based on selected user preferences chosen by a user or automatic preferences generated from accumulated statistics on user's contents consumption. The system transmits the transformed contents to the user and provides services which perform rendering or storing according to user preferences. Therefore, the system provides contents transformed according to user's interests to thereby increase user's convenience (universal multimedia access) and satisfy a variety of user's demands.

37 Claims, 3 Drawing Sheets

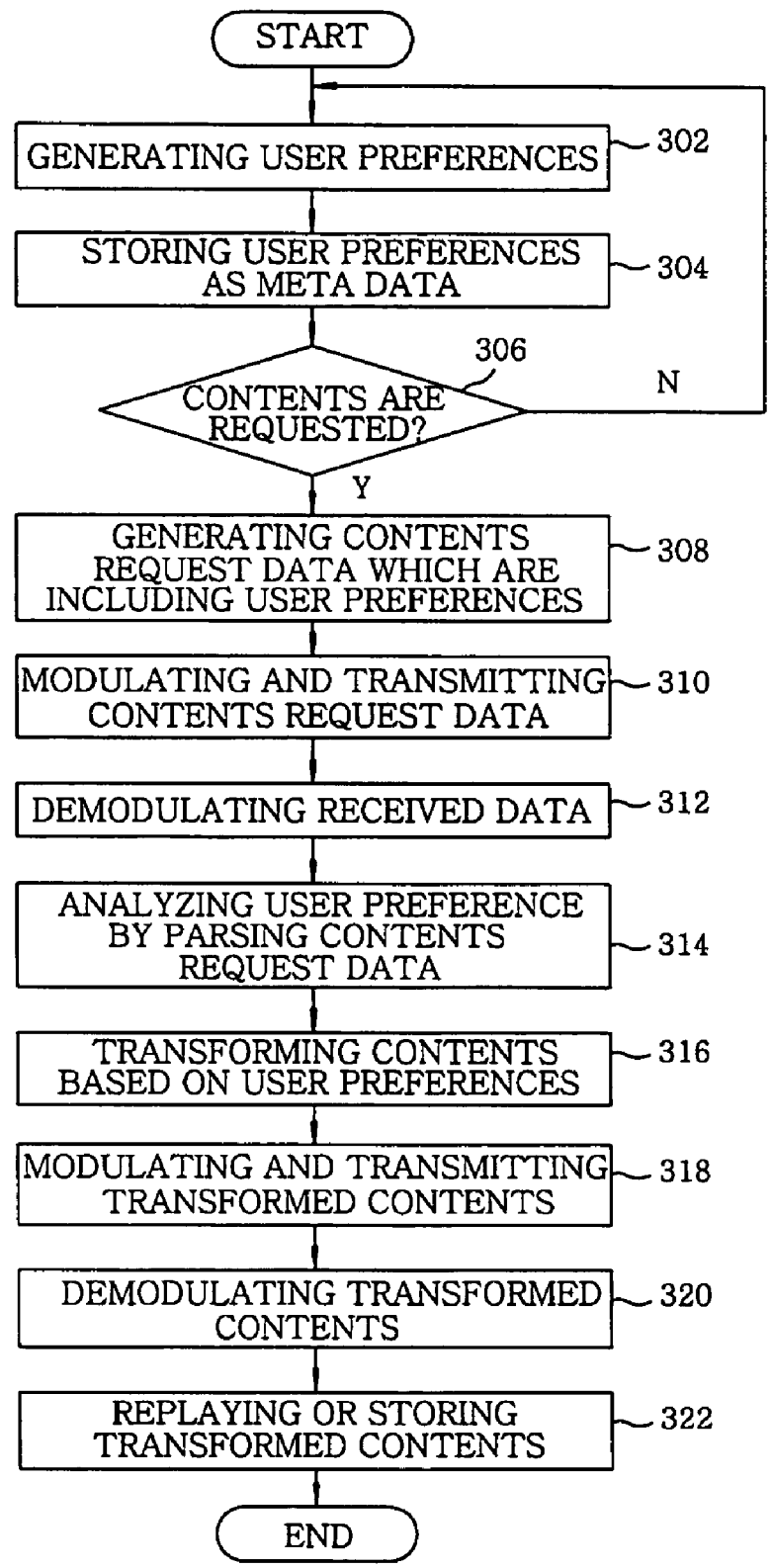

# SYSTEM, METHOD AND STORAGE MEDIUM FOR PROVIDING A MULTIMEDIA CONTENTS SERVICE BASED ON USER'S PREFERENCES

This application is a Continuation Application of PCT International Application No. PCT/KR2003/02139 filed on Oct. 15, 2003, which designated the United States.

FIELD OF THE INVENTION

The present invention relates to a system, method and storage medium for transforming multimedia contents such as images, audio, video and text, based on user preferences in which the transformed multimedia contents can be universally accessed.

BACKGROUND OF THE INVENTION

In a conventional content-transforming(or content-transcoding) system, the major technical challenge or limitation lay in the network resource and display capability of a terminal; and therefore, the conventional method of transcoding images was mainly concerned with reducing the spatial resolutions of images or removing color components from the color data. Similarly, the conventional method of transforming video data was mostly concerned with reducing their temporal resolutions.

While the conventional methods allow a user to reserve time and channel for recording or storing the whole contents, it does not allow the user to store preferred parts (or portions) of the contents in various apparatuses. Rather, the conventional methods merely allowed the user to play the contents on a predetermined display device.

This method, however, cannot reflect the user preferences on contents. It merely performs functions of transforming, rendering or replaying the contents in straight forward manners. Furthermore, preferred parts of contents could neither be stored at a desired device nor be remotely displayed on a preferred display device in a desired manner. Therefore, the conventional methods are not appropriate to support user's various demands with different preferences in content consumption.

SUMMARY OF THE INVENTION

It is, therefore, an object of the present invention to provide a system for servicing multimedia contents and a method for transforming, adapting or serving multimedia contents such as images, audio, video and text contents, based on the user preferences on parts of interest in contents and rendering methods of contents.

It is another object of the present invention to provide a system for servicing multimedia contents and a method for storing or replaying desired parts of requested contents in a desired manner based on the user preferences, e.g., by using desired storage device or desired display device that may be located remotely.

It is still another object of the present invention to provide a computer readable storage medium on which programs are stored for transforming and servicing multimedia contents such as images, graphics, audio, video and texts based on the user preferences on parts of interest in contents and preferred rendering modes of the contents.

In accordance with one aspect of the invention, there is provided a contents service system, including a contents server, for providing a user terminal with a multimedia contents service through a network, the system comprising: means for generating user preferences; means for storing the user preferences as meta data, retrieving corresponding meta data in response to requests for a contents service and generating contents-request-data including contents-service-request-information and user preferences information; means for transmitting the contents-request-data to the contents server through the network; means for parsing the contents-request-data and then generating parsed user preference information; means for transforming requested contents according to the contents-service-request-information based on the parsed user preference information and then generating the transformed contents; means for transmitting the transformed contents to the user terminal through the network; and means for replaying or storing the transformed contents.

In accordance with another aspect of the invention, there is provided a method for providing a user terminal with a multimedia contents service through a network, the method comprising the steps of: generating user preferences; storing the user preferences as meta data, retrieving corresponding meta data in response to requests for a contents service, generating contents-request-data including contents-service-request-information and user preferences information, and transmitting the contents-request-data to a contents server through the network; parsing the contents-request-data and then generating parsed user preference information; transforming requested contents according to the contents-service-request-information, based on the parsed user preference information, then generating the transformed contents, and then transmitting the transformed contents to the user terminal through the network; and replaying or storing the transformed contents.

In accordance with still another aspect of the invention, there is provided a computer readable storage medium, on which programs for providing a user terminal with a multimedia contents service through a network are stored, wherein the program performing the steps of: generating user preferences; storing the user preferences as meta data, retrieving corresponding meta data in response to requests for a contents service, generating contents-request-data including contents-service-request-information and user preference information, and transmitting the contents-request-data to a contents server through the network; parsing the contents-request-data and then generating parsed user preference information; transforming requested contents according to the contents-service-request-information, based on the parsed user preference information, then generating the transformed contents, and then transmitting the transformed contents to the user terminal through the network; and replaying or storing the transformed contents.

In accordance with still another aspect of the invention, there is provided a contents service system, including a contents server, for providing a user' terminal with a multimedia contents service through a network, the system comprising: means for generating user preferences; means for storing the user preferences as meta data, generating contents-request-data in response to requests for a contents service, and then transmitting the contents-request-data to the contents server through the network; means for transmitting contents requested to the user terminal through the network in response to the contents-request-data; means for retrieving the meta data corresponding to the contents-service-request and then generating parsed user preference information; means for transforming the contents, which are received, based on the parsed user preference information and then generating the transformed contents; and means for replaying or storing the transformed contents.

In accordance with still another aspect of the invention, there is provided a method for providing a user' terminal with a multimedia contents service through a network, the method comprising the steps of: generating user preferences; storing the user preferences as meta data, generating contents-request-data in response to requests for a contents service, and then transmitting the contents-request-data to a contents server through the network; transmitting contents requested to the user terminal through the network in response to the contents-request-data; retrieving meta data corresponding to the contents-service-request and then generating parsed user preference information; transforming the contents received based on the parsed user preference information and then generating the transformed contents; and replaying or storing the transformed contents.

In accordance with still another aspect of the invention, there is provided a computer readable storage medium, on which programs for providing a user' terminal with a multimedia contents service through a network are stored, wherein the program performing the steps of: generating user preferences; storing the user preferences as meta data, generating contents-request-data in response to requests for a contents service, and then transmitting the contents-request-data to a contents server through the network; transmitting contents requested to the user terminal through the network in response to the contents-request-data; retrieving meta data corresponding to the contents-service-request and then generating parsed user preference information; transforming the contents received based on the parsed user preference information and then generating the transformed contents; and replaying or storing the transformed contents.

BRIEF DESCRIPTION OF THE DRAWINGS

The above and other objects and features of the present invention will become apparent from the following description of the preferred embodiment given in conjunction with the accompanying drawings, in which:

FIG. 3 is a flow chart showing a process of providing multimedia contents service based on user preferences.

DETAILED DESCRIPTION OF THE PREFERRED EMBODIMENTS

In the following, preferred embodiments of the present invention will now be described with reference to the accompanying drawings.

An embodiment according to the present invention transforms requested multimedia contents based on user preferences on spatiotemporal interest, regions of interest, or parts of interest in the contents, preferences on rendering speed of audio, video or textual contents, preferences on rendering directions (forward, backward, fast forward, fast backward etc.), preferences on a particular interval in audiovisual contents, preference on selecting points, preferences on related contents of user's preferred contents, preferences on storing (or recording) and (remote) rendering devices and services the user with the transformed multimedia contents. The preferences on spatiotemporal interest, regions of interest, or parts of interest in the contents may include user preferences on scenes or tracks where certain characters appear, preference on certain frames showing soccer or basketball game score, and preferences on text contents having certain words or phrases, and preferences on specific intervals within audio contents.

Alternatively, the embodiment according to the present invention may generate automatic preferences based on accumulated statistics on such information as genres, types of contents or selected preferences of each content whenever a user is serviced with multimedia contents. The embodiment according to the present invention may transform requested multimedia contents based on the automatic preferences and may service such transformed multimedia contents to the user. Furthermore, the embodiment according to the present invention may allow desired parts of requested contents to be stored in a storage device or be rendered on a display device which may be located remotely.

Hereinafter, user preferences chosen or designated by the user are referred to as "selected user preferences" while user preferences that are generated from accumulated statistics of the user's consumption of the contents are referred to as "automatic preferences."

In the following, an embodiment of the present invention is described in detail with reference to the accompanying drawings.

Figure 1:
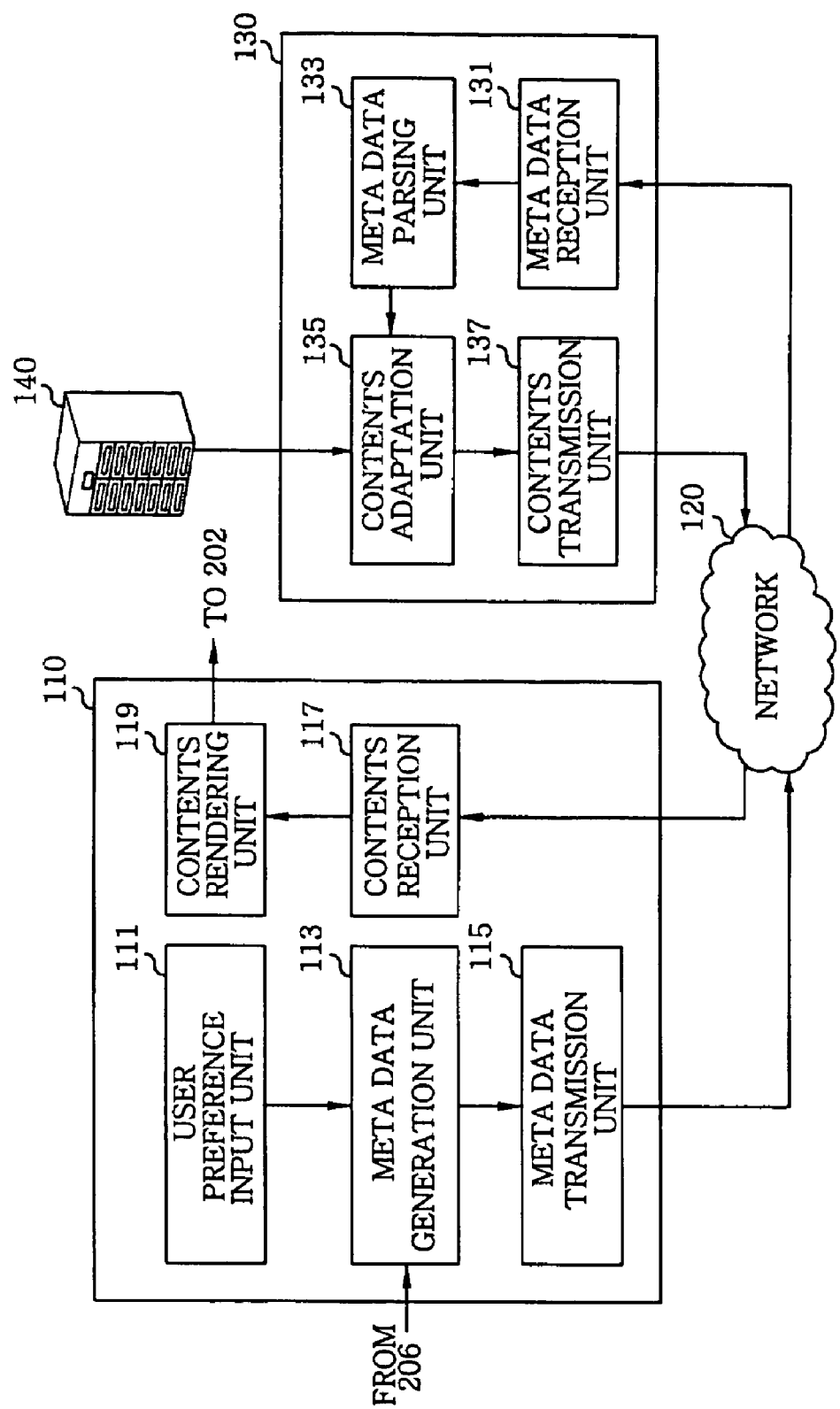
FIG. 1 is a block diagram showing a system for providing multimedia contents service based on user preferences in accordance with the preferred embodiment of the present invention.

FIG. 1 is a block diagram showing a system for providing multimedia contents service based on the user preferences according to the preferred embodiment of the present invention. The system includes a user terminal 110, a network 120, a contents server system 130 and a contents supply unit 140.

The user terminal 110 may be either a wired terminal such as a computer having a connecting unit or a wireless terminal such as cellular phones, PCS phones, PDAs, IMT-2000 compliant phones, PDA phones and smart phones. The user terminal 110 includes a user preference input unit 111, a meta data generation unit 113, a meta data transmission unit 115, a contents reception unit 117 and a contents rendering unit 119. The contents server system 130 includes a meta data reception unit 131, a meta data parsing unit 133, a contents adaptation unit 135 and a contents transmission unit 137.

Referring to FIG. 1, the user preference input unit 111 can include human interface devices such as keypads having numerical keys and function keys, touch pads and voice recognition devices. The user preference input unit can request service of desired contents as well as allow the user to select the user preferences. The user preferences include the user preferences on spatiotemporal fields or areas of the contents, preference on section units, preference on selecting points and preference on related contents of the user's preferred contents.

The user preferences on spatiotemporal fields or areas of images, audios, videos or textual contents refer to the user preferences on spatiotemporal interest, regions of interest, or parts of interest in the contents. For instance, preferences on spatiotemporal interest, regions of interest, or parts of interest in images or video contents may refer to portions of the contents where specific characters appear or frames of content where scores of soccer or basketball games appear. Similarly, in audio contents, preferences on temporal interest, intervals of interest, or parts of interest may refer to certain sections (intervals) of audio contents which are of interest to the user. Finally, in textual contents, preferences on spatiotemporal interest, regions of interest, or parts of interest may refer to contents that have certain words or sentences in synopses or closed-captions.

The preferences on section units refer to the user preferences on the unit to be used in showing preferred sections of images, audios, videos or textual contents. The preferences on section units may include preferences among conventional units and user-defined units. The preferences on section units allow a user to choose either the conventional units or the user-defined units as default section units. Such conventional and user-defined units include, among others, "second," "frame," "scene," "shot," "topic," "page," "line," "word" and any combination of these units or other user-defined units.

The selecting point preferences can include preferences among conventional selecting points and user-defined selecting points. The selecting point preferences allow a user to choose either the conventional selecting points or the user-defined selecting points as default selecting points. Such conventional and user-defined selecting points include, among others, "now," "before," "after," "start," "end," "half," "a quarter," "three quarters" and any combination of such selecting points.

The user preferences on rendering speed of audios, videos or textual contents include user preferences between semantic speed and numerical speed. The semantic speed refers to speed denoted in terms of words whereas the numerical speed refers to speed measured in terms of figures. Such semantic speed includes "fastest," "faster," "fast," "slow," "slower," "slowest," any combination thereof and any other speed denoted by other words.

The preferences on contents storage refers to user preferences on the amount of contents to be recorded or stored, recording time, preferred parts of the contents and locations of a recording apparatus. The preference on rendering devices refers to a preferred device for rendering and replaying the desired contents.

The preferences on related-contents concern user's choices on related contents of the preferred contents, e.g., whether the user prefers the original version of the contents, summarized contents or parts of the contents, and whether the user prefers additional information regarding the original contents.

Furthermore, the user preferences may also include preferences relating to repetitive replays, replay directions, random access and single frame replays of audios, videos and/or textual contents. The preferences relating to random access preference refers to the user preference on jumping to any desired points within the contents. The preferences relating to the single frame replay refers to the user preference on replaying only certain frames until the user's next response is given when replaying the contents on a frame-by-frame basis under the user's request. Preferences on repetitive replay concern the number of repetitive replays; that is, the preferences on repetitive replay concerns setting either a single replay mode or a repetitive replay mode as a default mode. The replay direction preferences may set either forward direction or backward direction as default replay direction.

Furthermore, the user preferences may include user preferences on font sizes and text color of contents. If texts are transformed to synthesized audio outputs, this preference further includes the user preferences concerning such conversion from the text to audio outputs.

A meta data generation unit 113 stores preferences selected by a user preference input unit 111 in a memory (not shown) as meta data. The meta data generation unit 113 also generates contents-request-data in response to requests for a contents service and transfers the contents-request-data to a meta data transmission unit 115. The contents-request-data include contents-service-request-information and user preferences information that is generated by retrieving the stored meta data corresponding to the contents-service-request-information. Further, the contents-request-data may include information on a designated user terminal. A contents server system may transmit transformed (transcoded or adapted) contents to a user terminal when the designated user terminal information is detected. Furthermore, the contents-request-data may include information on replaying or storing time of the contents. Any user terminal may replay or store the transformed contents received according to the information on replaying or storing time.

In other words, the embodiments of the present invention may be configured so that the user may designate any third party terminal rather than his or her own terminal; that is, terminal-designation-information may be inserted into the contents-request-data which are transmitted to the contents server system. Then the contents server system transmits transformed multimedia contents to a designated user terminal such as a storage device or a rendering device. Such transformed multimedia contents can be rendered or stored whenever requested.

In addition, a meta data transmission unit 115 transforms or modulates the contents-request-data into signals that can be transmitted via a wired or wireless network to the meta data reception unit 131 of the contents server system through the network 120. The network 120 may be a network including a wired network and/or a wireless network connected to both the internet and the mobile communications networks.

On the other hand, in the embodiments of the present invention, not only the preferences intentionally selected or designated by the user, but also automatic preferences generated based on statistics on preferred contents may be inserted into the contents-request-data to be transmitted. The automatic preferences are generated statistically based on information such as the user's favorite genres, types of contents and selected preferences of contents accumulated whenever the user is serviced with multimedia contents.

Figure 2:
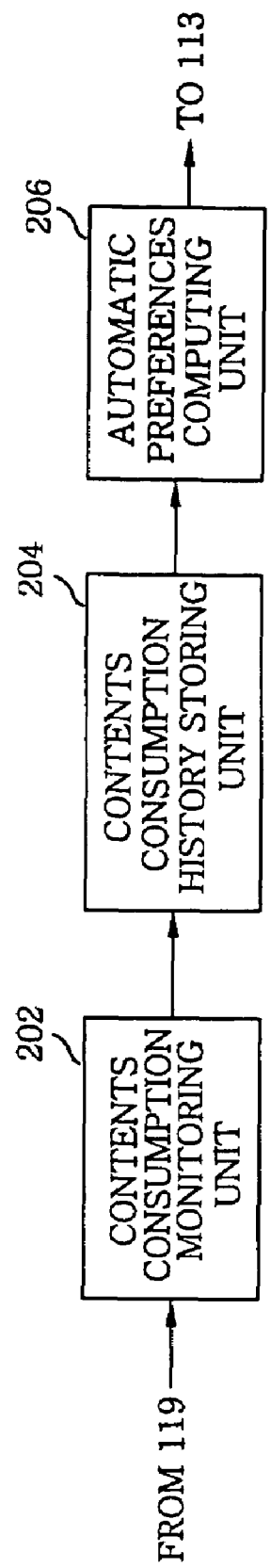
FIG. 2 describes a detailed block diagram showing a device for producing automatic preferences of a user.

FIG. 2 is a detailed block diagram of a device for producing the automatic preferences. The device includes a contents consumption monitoring unit 202, a contents consumption history storing unit 204 and an automatic preferences computing unit 206.

Referring to FIG. 2, the contents consumption monitoring unit 202 extracts history on contents consumption by monitoring the transformed contents provided by a contents rendering unit 119 in FIG. 1. The contents consumption history is accumulated, together with the previous contents consumption history, in the contents consumption history storing unit 204.

Then, the automatic preferences computing unit 206 obtains automatic preferences based on the accumulated statistics for the user's consumption of the contents. For example, the automatic preferences can be computed by the following method:

1. Preference on a character=(the number of text queries in names for finding an actor or actress)/(the total number of contents consumed)

2. Preference on a genre=(the number of consumed contents belonging to a genre)/(the total number of contents consumed)

3. Preference on rendering speed of audio contents=(the number of audio contents played at a certain rendering speed)/(the total number of contents consumed)

4. Preference on specific words or sentences=(the number of contents consumed which includes a specific word or sentence)/(the total number of contents consumed)

The automatic preferences obtained by the above method are transferred to the meta data generation unit in FIG. 1 and are stored in a memory (not shown) as meta data.

Therefore, in accordance with the present invention, a user may be provided with transformed contents which he or she desires through aforementioned process which uses the automatic preferences that are automatically generated based on the contents consumption history.

On the other hand, the contents server system 130 generates transformed contents by transforming or adapting original contents based on the user preferences in response to the contents-request-data that include either selected or automatic preferences information: The contents server system 130 transmits through the network 120 the generated transformed contents to the user terminal 110 or a designated user terminal such as a storage device or a rendering device. To assist such functions, the contents server system 130 includes a meta data reception unit 131, a meta data parsing unit 133, a contents adaptation unit 135 and a contents transmission unit 137.

Here, the meta data reception unit 131 transmits the transformed contents-request-data that includes the user preferences information through the network to the meta data parsing unit 133 after inversely transforming or demodulating the contents-request-data into the original data.

Thereafter, the meta data parsing unit 133 analyzes the inversely transformed contents-request-data including the user preferences information, verifies its validity, parses the user preferences information, and then transmits the parsed user preference information to the contents adaptation unit 135.

In response, the contents adaptation unit 135 reads requested contents from a contents supply unit 140, transforms and processes the contents based on the user preferences, which are either preferences manually selected by the user or automatically generated based on statistical analysis and then transmits the contents to the contents transmission unit 137. The contents supply unit 140 includes a database for storing contents and a unit for reading, storing and updating the stored contents.

Specifically, the contents adaptation unit 135 transforms the original contents by changing spatiotemporal resolution of image or video data or extracting parts of text contents and focusing on a region of interest in contents in consideration of limited bandwidth resources of the network and computing capacity of the user terminal. Consequently, contents based on the user preferences are generated.

Further, when the user preferences include the rendering speed preference, the contents adaptation unit 135 transforms the original contents based on the user preferences by changing rendering speed of audio, video or text contents to be either faster or slower. Therefore, by including a rendering speed preference concerning speech or sound in the user preference, speech components of the contents spoken in a gabbling manner can be manipulated so that the speech is reproduced slowly. Also, when text is converted into audio outputs, the rendering speed of the (synthesized) audio output can be configured.

Furthermore, when the user preferences include preferences on rendering direction, section units and selecting points, the contents adaptation unit 135 transforms the original contents based on the user preferences information in a manner described above.

Subsequently, the contents transmission unit 137 transforms or modulates contents data which are transformed based on the user preferences into signal data which can be transmitted via a wired or a wireless network. Then, the contents transmission unit 137 transmits the signal data to the contents reception unit 117 of the user terminal 110 through the network 120.

The contents transmission unit 137 also transforms or modulates contents data which can be transmitted based on the user preferences into signal data which can be transmitted via a wired or wireless network. Then, the contents transmission unit 137 transmits the signal data to the contents reception unit 117 of the user terminal 110 or other terminals designated by the user through the network 120, after which the signal data is stored.

Meanwhile, the contents reception unit 117 of the user terminal 110 inversely transforms or demodulates the transformed contents received through the network 120 back into the original contents. The contents, inverse-transformed in such a manner, are either stored in a storage area according to the user preference on storing of the contents or transmitted to the contents rendering unit 119 for replaying.

Next, the user may view or listen to the contents replayed by the rendering unit 119 which are inverse-transformed according to the user preferences. For example, the contents may be replayed so that contents having voice components spoken in a gabbling manner may be reproduced in a slower manner. Texts may also be converted to audio outputs.

A process of the present invention for providing multimedia contents transformed in the multimedia contents service system of above construction according to the selected or automatic user preferences will be described hereinafter.

FIG. 3 is a flow chart showing a process of servicing multimedia contents based on the user preferences according to the preferred embodiment of the present invention.

Referring to FIG. 3, the user preferences including preferences on spatiotemporal fields or areas of images, audio, video or texts, preferences on rendering speed and direction of audio, video or texts, preferences on section units and preferences on selecting points of audio, video and texts are fed through the user input unit 111 of the user terminal 110 in response to the user's manipulation (step 302), and then the fed user preferences (i.e., selected preferences) are stored in the memory(not shown) as meta data (step 304).

Alternatively, the user preferences can be generated automatically from accumulated statistics on information such as genres, types of contents, and selected preferences of every contents whenever the user is serviced with multimedia contents rather than the user's directly selecting or designating of preferences as described above. The automatic preferences obtained in such a manner are stored in a memory (not shown) as meta data.

Next, the user terminal checks whether the user requests multimedia contents service in step 306. If the multimedia contents service is requested, the user terminal retrieves corresponding meta data stored in the memory and generates contents-request-data which include the contents service-request-information and the user preferences information (step 308).

Subsequently, the user terminal transforms or modulates the contents-request-data into signals that can be transmitted via a wired or a wireless network. The user terminal transmits the signal to the meta data reception unit 131 of the contents server system 130 (step 310). The meta data reception unit 131 inversely transforms or demodulates the transformed contents-request-data that include either selected or automatic preferences received through the network 120 into original data which are transmitted to the meta data parsing unit 133 (step 312).

Then, the meta data parsing unit 133 analyzes the contents-request-data, including the user preferences. The meta data parsing unit 133 transmits parsed user preference information and contents-service-request-information to the contents adaptation unit 135 (step 314).

Subsequently, the contents adaptation unit 135 retrieves requested contents from the contents provision unit 140 based on the contents-service-request. The contents adaptation unit 135 then transforms the contents based on the user preferences (step 316).

The contents data, transformed based on the user preferences, are transformed or modulated into signal data which can be transmitted via a wired or a wireless network. The transformed contents are transmitted through the network 120 to the user terminal 110 or any other terminal designated by the user (step 318).

The contents reception unit 117 inversely transforms or demodulates the contents data according to the user preferences back into the original contents which are transmitted through the network 120 (step 320). Then the contents are replayed or stored in a storage area or a memory (not shown) according to the user preferences (step 322).

Meanwhile, in the preferred embodiment of the present invention, the contents server system transforms the original contents according to the meta data and transmits the transformed contents to the user terminal requesting the service or any other terminal designated by the user when the user of any terminal requests contents service by using meta data including the user preferences information.

The present invention, however, is not limited to the above embodiment. For example, the user terminal or any other terminal designated by the user rather than the contents server system may transform the original contents according to the meta data and replay or store the contents.

In this case, the user terminal 110 needs not transmit the meta data to the contents server system 130 when the contents service is requested. Then, the contents adaptation unit 135 of the content server system 130 transmits the requested original contents, which is not transformed, to the user terminal 110 or any other terminal designated by the user through the contents transmission unit 137 and the network 120. Subsequently, the contents reception unit 117 of the user terminal 110 analyzes the meta data including the user preferences provided by the meta data generation unit 113, transforms the received original contents according to analyzed results, and then transmits the contents to the contents rendering unit 119 for replaying or storing of the contents.

On the other hand, a program or algorithm that generates the user preferences according to an embodiment of the present invention, transforms the original contents based on the user preferences and transmits the transformed contents to the user may be recorded on a storage medium. The storage medium may be mounted or loaded onto an apparatus and read through apparatuses such as computers.

In the conventional method for transforming and servicing contents, resolution is reduced or color components are removed to convert color data into black-and-white data when the image contents are concerned while resolution of each frame or spatial resolution is reduced when video contents are concerned. In contrast, the embodiment according to the present invention generates the user preferences, e.g., user preferences on regions (or parts) of interest in contents, rendering speed and direction of contents, section units and selecting points. The embodiments according to the present invention transforms the original contents based on the user preferences, transmits the transformed contents to the user, and provides customized multimedia service according to the user preferences, i.e., adapted contents that are transformed according to each user's individual preference. Further, in the embodiments of the present invention, the user may store or render the desired amount of requested contents or related contents at a designated storage device or a designated rendering device at desired time. Accordingly, the present invention may serve a variety of user's demand.

While the present invention has been shown and described with respect to the preferred embodiments, it will be understood by those skilled in the art that various changes and modifications may be made without departing from the spirit and scope of the invention.

What is claimed is:

1. A contents service system, including a contents server, for providing a user terminal with a multimedia contents service through a network, the system comprising:
   means for generating user preferences;
   means for storing the user preferences as meta data, retrieving corresponding meta data in response to requests for a contents service and generating contents-request-data including contents-service-request-information and user preferences information;
   means for transmitting the contents-request-data to the contents server through the network;
   means for parsing the contents-request-data and then generating parsed user preference information; means for transforming requested contents according to the contents-service-request-information based on the parsed user preference information and then generating the transformed contents;
   means for transmitting the transformed contents to the user terminal through the network; and
   means for replaying or storing the transformed contents.

2. The system of claim 1, wherein the contents-request-data include designated user terminal information and the contents server, if the designated user terminal information is detected, transmits the transformed contents to the designated user terminal.

3. The system of claim 1, wherein the user preferences include user preferences on spatiotemporal fields or areas of images, audios, videos and/or textual contents.

4. The system of claim 1, wherein the user preferences include preferences on rendering speed of audios, videos or textual contents.

5. The system of claim 1, wherein the user preferences include user preferences on repetitive replays, replay directions, random access, single frame replays of audios, videos and/or textual contents, the random access preference representing preference on jumping to any desired points within the contents and the single frame replay preference indicating preferences on replaying only certain frames until the user's next response is given when replaying the contents on a frame-by-frame basis under the user's request.

6. The system of claim 1, wherein the user preferences include user preferences on text contents having certain words or phrases.

7. The system of claim 6, wherein the user preferences include user preferences on font sizes or color of text contents.

8. The system of claim 1, wherein the user preferences include user preferences concerning conversion from a text to audio outputs.

9. The system of claim 1, wherein the user preferences include user preferences on related-contents concerning user's choices on related contents of the preferred contents.

10. The system of claim 9, wherein the user preferences on related-contents concern whether the user prefers the original version of the contents, summarized contents or parts of the contents, and whether the user prefers additional information regarding the original contents.

11. The system of claim 1, wherein the user preferences include user preferences on recording devices, recording time, recording amount and rendering devices of user's preferred contents or related contents of the preferred contents.

12. The system of claim 1, wherein the user terminal is a wired or wireless terminal and the network is a network including a wired network and/or wireless network connected to both the internet and the mobile communications networks.

13. The system of claim 1, further comprising: means for monitoring the transformed contents received, and extracting contents consumption history; means for storing the contents consumption history; means for computing automatic preferences based on accumulated statistics on the contents consumption history; and means for storing the automatic preferences as the meta data.

14. The system of claim 13, wherein the automatic preferences include preference on characters, preference on genres, preference on rendering speed of audio contents, preference on text contents having certain words or phrases, preference on storage devices, storing time, storing amount, rendering devices of user's preferred contents or related contents of the preferred contents and any combination thereof.

15. A method for providing a user terminal with a multimedia contents service through a network, the method comprising the steps of:
generating user preferences;
storing the user preferences as meta data, retrieving corresponding meta data in response to requests for a contents service, generating contents-request-data including contents-service-request-information and user preferences information, and transmitting the contents-request-data to a contents server through the network;
parsing the contents-request-data and then generating parsed user preference information;
transforming requested contents according to the contents-service-request-information, based on the parsed user preference information, then generating the transformed contents, and then transmitting the transformed contents to the user terminal through the network; and
replaying or storing the transformed contents.

16. The method of claim 15, wherein the contents-request-data include designated user terminal information and the contents server, if the designated user terminal information is detected, transmits the transformed contents to the designated user terminal.

17. The method of claim 16, wherein the contents-request-data include replaying or storing time information of the transformed contents and the designated user terminal replays or stores the transformed contents according to the replaying or storing time information.

18. The method of claim 15, wherein the user preferences are selected user preferences chosen by a user.

19. The method of claim 15 wherein the user preferences are automatic preferences that are generated based on accumulated statistics on such information as genres, types of contents or selected preferences of every content whenever a user is serviced with multimedia contents.

20. The method of claim 19, wherein the automatic preferences include preference on characters, preference on genres, preference on rendering speed of audio contents, preference on text contents having certain words or phrases, preference on storage devices, storing time, storing amount, rendering devices of user's preferred contents or related contents of the preferred contents and any combination thereof.

21. The method of claim 15, wherein the user preferences include user preferences on spatiotemporal fields or areas of images, audios, videos and textual contents, user preferences on recording devices, recording time, recording amount and rendering devices of user's preferred contents or related contents of the preferred contents and any combination thereof.

22. The method of claim 15, wherein the user preferences include user preferences on rendering speed of audios, videos or textual contents, user preferences on recording devices, recording time, recording amount and rendering devices of user's preferred contents or related contents of the preferred contents and any combination thereof.

23. The method of claim 15, wherein the user preferences include user preferences on text contents having certain words or phrases, user preferences on recording devices, recording time, recording amount and rendering devices of user's preferred contents or related contents of the preferred contents and any combination thereof.

24. The method of claim 15, wherein the user preferences include user preferences on font sizes and color of text contents, user preferences on recording devices, recording time, recording amount and rendering devices of user's preferred contents or related contents of the preferred contents and any combination thereof.

25. The method of claim 15, wherein the user preferences include user preferences concerning conversion from the text to audio outputs, user preferences on recording devices, recording time, recording amount and rendering devices of user's preferred contents or related contents of the preferred contents and any combination thereof.

26. A computer readable storage medium, on which programs for providing a user terminal with a multimedia contents service through a network are stored, wherein a program is stored on the storage medium and loadable onto a computer, the loaded program executed by the computer performs the steps of:
generating user preferences;
storing the user preferences as meta data, retrieving corresponding meta data in response to requests for a contents service, generating contents-request-data including contents-service-request-information and user preferences information, and transmitting the contents-request-data to a contents server through the network;
parsing the contents-request-data and then generating parsed user preference information;
transforming requested contents according to the contents-service-request-information, based on the parsed user preference information, then generating the transformed contents, and then transmitting the transformed contents to the user terminal through the network; and
replaying or storing the transformed contents.

27. The storage medium of claim 26, wherein the user preferences include user preferences on spatiotemporal fields or areas of images, audios, videos and textual contents, user preferences on recording devices, recording time, recording amount and rendering devices of user's preferred contents or related contents of the preferred contents and any combination thereof.

28. A contents service system, including a contents server, for providing a user' terminal with a multimedia contents service through a network, the system comprising:
means for generating user preferences;
means for storing the user preferences as meta data, generating contents-request-data in response to requests for a contents service, and then transmitting the contents-request-data to the contents server through the network;
means for transmitting contents requested to the user terminal through the network in response to the contents-request-data;
means for retrieving the meta data coffesponding to the contents-service-request and then generating parsed user preference information;

means for transforming the contents, which are received, based on the parsed user preference information and then generating the transformed contents; and means for replaying or storing the transformed contents.

29. The system of claim 28, wherein the contents-request-data include designated user terminal information and the contents server, if the designated user terminal information is detected, transmits the transformed contents to the designated user terminal.

30. The system of claim 29, wherein the contents-request-data include replaying or storing time information of the transformed contents and the designated user terminal replays or stores the transformed contents according to the replaying or storing time information.

31. The system of claim 28, wherein the user preferences include user preferences on spatiotemporal fields or areas of images, audios, videos and textual contents, user preferences on recording devices, recording time, recording amount and rendering devices of user's preferred contents or related contents of the preferred contents and any combination thereof.

32. A method for providing a user' terminal with a multimedia contents service through a network, the method comprising the steps of:

generating user preferences;

storing the user preferences as meta data, generating contents-request-data in response to requests for a contents service, and then transmitting the contents-request-data to a contents server through the network;

transmitting contents requested to the user terminal through the network in response to the contents-request-data;

retrieving meta data corresponding to the contents-service-request and then generating parsed user preference information;

transforming the contents received based on the parsed user preference information and then generating the transformed contents; and replaying or storing the transformed contents.

33. The method of claim 32, wherein the contents-request-data include designated user terminal information and the contents server, if the designated user terminal information is detected, transmits the transformed contents to the designated user terminal.

34. The method of claim 33, wherein the contents-request-data include replaying or storing time information of the transformed contents and the designated user terminal replays or stores the transformed contents according to the replaying or storing time information.

35. The method of claim 32, wherein the user preferences include user preferences on spatiotemporal fields or areas of images, audios, videos and textual contents, user preferences on recording devices, recording time, recording amount and rendering devices of user's preferred contents or related contents of the preferred contents and any combination thereof.

36. A computer readable storage medium, on which programs for providing a user'terminal with a multimedia contents service through a network are stored, wherein a program is stored on the storage medium and loadable onto a computer, the loaded program executed by the computer performs the steps of:

generating user preferences;

storing the user preferences as meta data, generating contents-request-data in response to requests for a contents service, and then transmitting the contents-request-data to a contents server through the network;

transmitting contents requested to the user terminal through the network in response to the contents-request-data;

retrieving meta data corresponding to the contents-service-request and then generating parsed user preference information;

transforming the contents received based on the parsed user preference information and then generating the transformed contents; and replaying or storing the transformed contents.

37. The storage medium of claim 36, wherein the user preferences include user preferences on spatiotemporal fields or areas of images, audios, videos and textual contents, user preferences on recording devices, recording time, recording amount and rendering devices of user's preferred contents or related contents of the preferred contents and any combination thereof.

* * * * *

UNITED STATES PATENT AND TRADEMARK OFFICE
CERTIFICATE OF CORRECTION

PATENT NO. : 7,657,563 B2  Page 1 of 1
APPLICATION NO. : 11/106628
DATED : February 2, 2010
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1298 days.

Signed and Sealed this

Twenty-eighth Day of December, 2010

David J. Kappos
*Director of the United States Patent and Trademark Office*